(12) United States Patent
Norwood et al.

(10) Patent No.: US 10,212,120 B2
(45) Date of Patent: Feb. 19, 2019

(54) DISTRIBUTED MESSAGE QUEUE STREAM VERIFICATION

(71) Applicant: Confluent, Inc., Palo Alto, CA (US)

(72) Inventors: Dan Norwood, Mountain View, CA (US); Neha Narkhede, Mountain View, CA (US); Anna Povzner, San Jose, CA (US); Joseph Adler, Los Altos, CA (US); Yasuhiro Matsuda, Palo Alto, CA (US); Jay Kreps, Mountain View, CA (US)

(73) Assignee: Confluent, Inc., Palo Alto, CA (US)

( * ) Notice: Subject to any disclaimer, the term of this patent is extended or adjusted under 35 U.S.C. 154(b) by 148 days.

(21) Appl. No.: 15/494,275

(22) Filed: Apr. 21, 2017

(65) Prior Publication Data

US 2017/0310628 A1    Oct. 26, 2017

Related U.S. Application Data

(60) Provisional application No. 62/325,936, filed on Apr. 21, 2016.

(51) Int. Cl.

| | |
|---|---|
| *G06F 15/16* | (2006.01) |
| *H04L 12/58* | (2006.01) |
| *H04L 12/26* | (2006.01) |
| *H04L 12/66* | (2006.01) |
| *G06F 9/54* | (2006.01) |
| *H04L 12/18* | (2006.01) |
| *H04L 29/06* | (2006.01) |
| *H04L 12/24* | (2006.01) |

(52) U.S. Cl.
CPC .............. *H04L 51/30* (2013.01); *G06F 9/546* (2013.01); *H04L 12/1859* (2013.01); *H04L 12/66* (2013.01); *H04L 43/045* (2013.01); *H04L 43/08* (2013.01); *H04L 51/18* (2013.01); *H04L 51/34* (2013.01); *H04L 41/0806* (2013.01); *H04L 43/106* (2013.01); *H04L 69/16* (2013.01)

(58) Field of Classification Search
CPC . H04L 12/66; H04L 12/1859; H04L 41/0806; H04L 69/16; G06F 9/546
See application file for complete search history.

(56) References Cited

U.S. PATENT DOCUMENTS

| | | | |
|---|---|---|---|
| 2003/0182464 A1* | 9/2003 | Hamilton | ................ G06F 9/546 719/314 |
| 2013/0060834 A1* | 3/2013 | Paramasivam | ......... H04L 12/66 709/202 |
| 2018/0159731 A1* | 6/2018 | Murthy | ............... H04L 12/1859 |

* cited by examiner

*Primary Examiner* — Kyung H Shin
(74) *Attorney, Agent, or Firm* — Kilpatrick Townsend & Stockton LLP

(57) ABSTRACT

A stream verification system for a distributed message queue system with metric collectors on each producer and consumer. A producer time stamp allows correlation of sent and received messages. Verification reports are organized by a message topic. A cumulative checksum allows detection of missing or corrupted messages. Verification messages are used to determine if a zero message report means no messages were sent, or rather that the messages weren't received.

20 Claims, 5 Drawing Sheets

DISTRIBUTED MESSAGE QUEUE STREAM VERIFICATION

CROSS-REFERENCES TO RELATED APPLICATIONS

This application is a nonprovisional patent application of Ser. No. 62/325,936 entitled "Distributed Message Queue Stream Audit," filed Apr. 21, 2016, the disclosure of which is hereby incorporated in its entirety.

BACKGROUND OF THE INVENTION

The present invention relates to distributed messaging systems, and in particular to verifying message delivery in such systems.

U.S. Pub. 20040167932 is an example discussing distributed message queues. A distributed message queue system is a system with one of more nodes that produce data, one or more nodes that queue data, and one or more nodes that consume data. Messages can be delayed, lost, corrupted or repeated. Thus, there is a need for verification (e.g., as part of a quality review or audit). Verification has been used in various systems. An example of a data stream filter for verification/audit trail generation is described in U.S. Pub. 20080243979.

Apache Kafka is an open-source distributed publish-subscribe messaging system that is designed to be fast, scalable and durable. Kafka maintains feeds of messages on different topics. Producers write messages to topics and consumers read messages from topics. Since Kafka is a distributed system, topics are partitioned and replicated across multiple nodes. Kafka treats each topic partition as a log (ordered set of messages). Kafka retains all messages for a certain time, and consumers are responsible for tracking their position in each log. Kafka can thus support a large number of producers, a large number of consumers, and a large amount of data with little overhead.

LinkedIn developed a system for simple auditing of message streams using message counts in time windows. It would be desirable to have a more robust verification system to allow trouble-shooting and improving the efficiency of the system.

BRIEF SUMMARY OF THE INVENTION

The present invention provides an improved system for efficiently measuring how many messages are successfully delivered through a distributed message queue. This can be referred to as a "stream verification." The stream verification measures the number of messages sent during a time period, and the number of messages that have been received so far during that time period, as well as characteristics and statistics of these messages and of their processing within the distributed message queue; for example, the speed of delivery. The stream verification system is designed to detect problems with the underlying message system messages that were delayed, lost, repeated, or corrupted.

In one embodiment, the invention is implemented with metrics collection plug-ins downloaded to both producers and consumers. These plug-ins send data to a central verification analysis service. A Metrics Management Application (MMA) service is provided, with an API to allow access to the central verification analysis service. Users of the MMA can drill-down for detailed information to trouble-shoot. This allows trouble-shooting of the whole system, as opposed to just the parts under the producer's control.

In one embodiment, verification reports are sent from producers and consumers to a central verification analysis service. In one embodiment, these verification reports are encapsulated in messages and sent through a distributed message queue system (similar or identical to the system being measured.) In one embodiment, these message reports contain counts of messages sent by producers and/or received by consumers. In one embodiment, these message reports contain a count on the number of bytes sent by producers and/or received by consumers. In one embodiment, these message reports contain measurements of message sizes, transport time, or other metrics. In one embodiment, these reports contain aggregate checksums for the data sent by producers and/or received by consumers.

Checksums are used for assuring that the set of messages produced equals the set of messages consumed. The checksum is a cumulative checksum that allows detection of a missing or corrupted message or messages. In one embodiment, the cumulative checksum takes existing checksums and aggregates them.

A complicating factor is that the verification reports themselves can be subject to the same problems, in that they themselves could be, for example, delayed, lost, repeated, or corrupted. Accordingly, the invention detects these same problems with verification reports. If a verification report is not received, the central metric analysis system cannot accurately determine if messages sent through the message queue systems were delayed, lost, repeated or corrupted. This invention uses a variety of mechanisms to differentiate between delayed, lost, repeated, or corrupted verification reports and delayed, lost, repeated, or corrupted data messages.

DETAILED DESCRIPTION OF THE INVENTION

Figure 1:
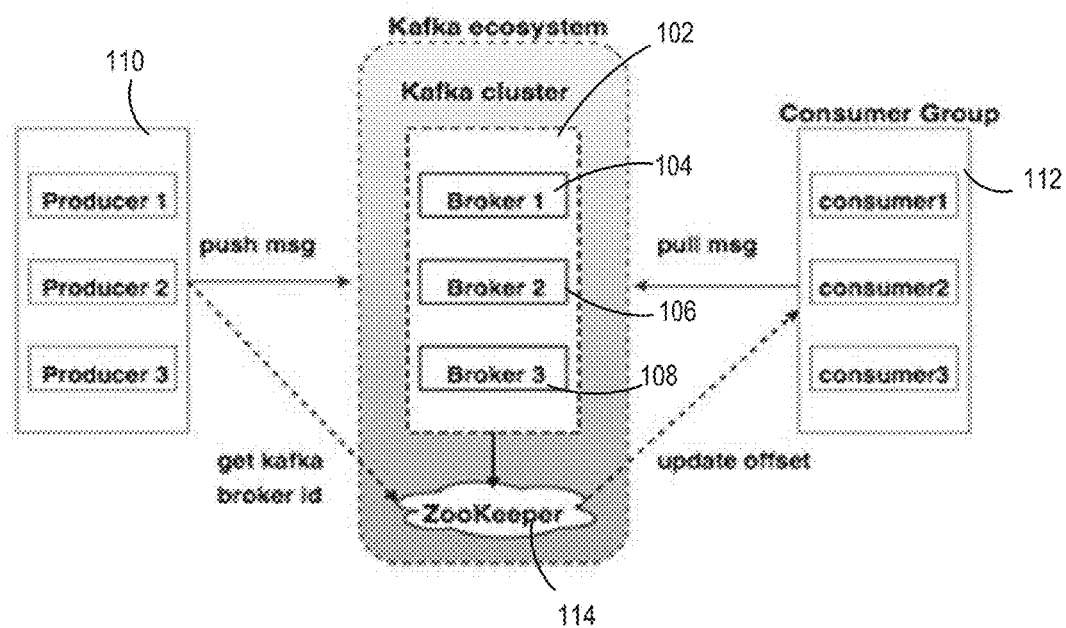
FIG. 1 is a diagram of a prior art Kafka system.

FIG. 1 is a diagram of a prior art Kafka system. A Kafka cluster 102 includes multiple brokers, such as brokers 104, 106 and 108. Producers 110 push messages to Kafka cluster 102, and consumers 112 pull the messages. The producers 110 get Kafka broker IDs from a Zookeeper 114. The Zookeeper also provides u dated offsets to the consumers 112.

The stream verification system of the present invention measures the performance of a distributed message system. This system contains the following components:

A metrics collector that runs on each producer computer.
A metrics collector that runs on each consumer computer.
A central verification analysis system.
A metric management application that provides query tools and human-readable reports to users.

As shown in FIG. 1, the various computers are connected over a network, such as the Internet. The various nodes shown can be computers or servers, with associated databases and software programs.

Metrics collectors on producers send verification reports to a distributed message system. (This might be the same system being measured, or another similar system.) Metrics collectors on consumers also send verification reports to the distributed message system. The metrics collector examines messages flowing through the distributed message system and generates verification reports for stream verification.

To do this, we group messages by time periods. Each message is tagged with a timestamp at the time it is produced, and we use these timestamps to group messages. Alternately, a serial number or another identifier could be substituted. The metrics collector on the producers will then calculate a set of measurements that describe all the messages produced during this time period. (For example, suppose that the system collected data in 5 minute long periods, starting promptly each hour. Suppose that between 03-11-2016 9:00:00 AM and 03-11-2016 9:04:59.999 AM there were 1000 messages produced on one node, that the cumulative size of these messages was 100,000 bytes. At the end of this time period, the producer node would record this information into an verification report and send this report to the central verification analysis system. This verification report contains an identifier for the producer, a description of the time period, a count of messages, a count of message size, and other relevant information.)

Similarly, each consumer would calculate a set of metrics about messages that it receives, grouped by the timestamps found in the messages (or other identifier within the messages). The consumer can also calculate the time difference between when a message was sent and when it was received (using the timestamp embedded in the message). Consumers would typically collect this information with a similar frequency to the producers, and send results as verification reports to the central verification analysis system.

The central verification analysis system would then aggregate this information together, producing a total count of all messages sent during a time period, and also calculate other metrics on messages received during a time period (including measurements of message size, timing, and other information), and report this back to a user.

Aligning Time Periods

In practice, it takes some time for messages to travel through the system. So, it is very likely that the sample windows for producers and consumers would not line up - - - it's likely that a set of messages sent within one time bucket (based on sender time) would be received gradually over several periods on the consumer side. The system is designed to allow this to occur: we simply aggregate multiple verification/audit messages from consumers together, updating our results.

For example, suppose that a producer sent 1000 messages between 03-11-2016 9:00:00 AM and 03-11-2016 9:04:59.999 AM, and that 800 were received between 03-11-2016 9:00:00 AM and 03-11-2016 9:04:59.999 AM, and 200 were received between 03-11-2016 9:05:00 AM and 03-11-2016 9:09:59.999 AM. The consumer verification process would send two verification messages: one saying that 800 messages sent between 03-11-2016 9:00:00 AM and 03-11-2016 9:04:59.999 AM were received between 03-11-2016 9:00:00 AM and 03-11-2016 9:04:59.999 AM, and one message saying that 200 messages that were sent between 03-11-2016 9:00:00 AM and 03-11-2016 9:04:59.999 AM were received between 03-11-2016 9:05:00 AM and 03-11-2016 9:099:59.999 AM.

Cumulative Checksums

In a distributed system, it is possible for a message to be sent more than once, or to be lost. In a set of messages, it's possible for some messages to be sent more than once and other messages to be lost. If you are very unlucky, it is possible for the number of duplicate messages and lost message to be equal.

If no messages are lost or duplicated, then the count of messages sent and received will be the same. If the number of messages that are duplicated and lost are not the same, then the total count of messages sent and received will not match (making it easy to detect a problem). But if the number of messages duplicated and lost are equal, then the count of messages sent and received will be equal, making it look like there was no problem.

To protect against this case, we have implemented another mechanism: a cumulative checksum. The cumulative checksum allows us to detect if the set of messages sent and received was the same. The checksum is a calculation that is performed on each message (in our case, just a cyclic redundancy check, or CRC). It is possible to sum these CRC codes together (retaining only the last n bits, in this case 32), and calculate a cumulative checksum for all the messages in a time window. The cumulative checksum calculation is associative and commutative: you can combine multiple checksums together in any order and get the same result. (Any operation on messages with these properties can be used.) Because of these properties, we can calculate checksums for all messages sent by a node, then combine these together to calculate an aggregate for all messages sent across all nodes. We can do the same with messages received. If the checksums of all messages sent and received are the same, it is very likely that the set of messages were the same. (For a 32 bit checksum, the chance that this mechanism misses a problem is $2^{-32}$ which is clearly a very small chance.)

Subsets of Messages

We can easily extend this system to cases where data is grouped or partitioned. For example, with Apache Kafka, data is split into different "topics" (like "web page views" or "ad clicks" or "purchases"), and can also be partitioned within these groups. We simply collect metrics (counts plus checksums) on these subsets of messages, and aggregate by subsets. This allows our system to provide more detailed reports.

Differentiating Lost Messages from Lost Data

The stream verification system is designed to measure the performance of a distributed message queue system that might lose data, but may also use a distributed message queue system that might lose data. If no messages are sent (or received) during a time window, the producer and consumer clients will report that no messages were sent (or received) during this time period. This allows the metrics service to differentiate between lost verification messages and lost or missing data. (A message showing no data was sent or received means no data, a missing message is ambiguous).

Protection Against Lost Verification/Audit Processes

If an audit process is stopped before it can report metrics to the metrics service, we might lose some information about messages sent (or received). To detect if this has happened, we use some additional information:

Each metrics collector is assigned a session number each time it starts. If the session number changes between messages, the metrics service can tell that the system was restarted and inform the user that some audit information may have been lost. The function of the session id is to identify that the producing or consuming application being monitored (i.e. the app for which metrics are being collected)—has been restarted (each restart will cause the session id to be incremented). This is significant because, when the metrics service is piecing together all of the metrics messages it receives from a given app, it can spot a change in session-id and know that the particular app being monitored has recently been off-line for some time during its restart and that therefore there is likely to be a window of time during which no metrics messages have been produced from it. Consequently the end-user of the message verification system can be informed that it is not strictly possible to verify the message delivery activity of that app within that time window.

Each message is given a sequence number. If a message is received out of order, the metrics system can tell the user that audit information has been lost.

Messages are sent even during periods with no data. If the metrics service fails to receive a message during a time period, the metrics system can tell the user that audit information has been lost.

Shutdown Messages

If a client is properly stopped, the metrics system knows not to wait for further messages and can confirm the correctness of the metrics.

Tool Overview

End to end instrumentation provides insights from producers to consumers, including for multiple Kafka clusters in the middle (connected through MirrorMaker or CopyCat). Performance metrics provided include metrics on latency and throughput (both messages per second and bytes per second). This includes order statistics (e.g., a histogram). Completeness and correctness metrics are provided to measure if messages are being delivered exactly once (and estimates of the number of lost or duplicate messages if they are not). This system provides a very low probability of false positives and false negatives.

Components

The following set of components are provided:

Producer "interceptor". Added client code insures that messages include the time stamp at which the message was initially sent by the producer. This timestamp is persisted across MirrrorMaker and CopyCat. Producer interceptors may change the messages being sent, and also send extra Kafka messages to the metrics service.

Consumer "interceptor". Added client code monitors messages as they are consumed, periodically sending metrics to the metrics service. Consumer interceptors don't change the message being sent but do send extra Kafka messages.

Metrics service. A metrics service collects information from consumers (and optionally brokers) about Kafka messages as they are received. This metrics service aggregates metrics about the cluster (and supports the algorithms). The metrics service is a Kafka consumer that reads metrics from a pre-defined topic for cluster metrics. It makes data available through an API that can be used by external services.

Front end. An application is provided to users to monitor the cluster. The Front End talks to the metrics service.

Copycat/Mirrormaker. This module preserves the producer time stamp when messages move from one cluster to another, even if they're re-partitioned.

Algorithm(s)

Several different algorithms compute metrics on a Kafka cluster, using a mixture of aggregate metrics (for groups of messages) and sampled metrics (for a subset of messages in each group) to calculate different metrics. Every message is labeled with a time stamp from when the producer first calls send. Messages are bucketed based on the producer labeled time stamps (with period p), producer, and topic. The system rounds or truncates timestamps, then groups messages based on these periods. These buckets are used by both producers and consumers. As producers produce messages, they collect some metrics and forward these to the metrics server. As consumers consume messages, they collect identical metrics and forward these to the metrics server. Within each bucket of messages, clients (producers and consumers) do two things:

Clients count the number of messages received during the time period. They also collect all the message checksums and combine them together (e.g., by just adding them together (ignoring overflow), or by XORing them). Clients calculate latency measurements within each bucket then either calculate summary statistics for latency, compute a histogram of latencies, and/or take a random sample of latencies. Periodically, clients forward these metrics to the metrics server. Clients (both producers and consumers) send messages to the metrics server that contain:

The source of the message (producer id, consumer id, etc.)
The "tier" (meaning producer, an intermediate kafka cluster, or consumer group)
The time bucket
The client id (so we can identify the producer)
The topic
The partition
A message count
A byte count
An aggregate checksum for all the messages
Latency data (summary statistics on latency, a histogram of latencies, or a random sample of latencies)

There might be more than one message sent to the metrics server for a given source/time bucket/producer/topic combination. (For example, this can occur if some messages are delivered late, or if boundaries are misaligned). Producers and consumers send a message for each bucket, even if no messages are received.

On the metrics server, computed metrics include:
For each tier/time bucket/producer ID/topic, computing:
A sum of message counts
A sum of byte count
An aggregate CRC
A set of latency measurements The following checks and calculations are performed:
Make sure the message count matches
Make sure byte count
Make sure CRC matches
Compute a distribution of latency metrics
Calculate bandwidth from the aggregate byte count and the window size
Compute average message size, messages per second, and anything else interesting An end-to-end delay usually occurs, so it takes some time before all messages are consumed. Consumers may also not consume data continuously (for example, if there is batch process collecting data). This means that some queries to the metric server might show incomplete results. That's expected behavior.

In one embodiment, producer time stamps and producer ids are persisted end to end. This information is included with each message and persisted across clusters. There are two embodiments to implement this:

In a first embodiment, changes are made to the core clients. We can make changes to the Kafka clients, adding the timestamp to the Kafka headers. CopyCat (and optionally mirror maker) are modified to persist this information across cluster boundaries. Clients are modified to make message checksums available. A plugin architecture in the client is provided for intercepting messages and doing supporting functions. This mechanism is also used to forward data to the metrics server. This approach is efficient and modular, and doesn't require a customer to change all their clients because messages aren't modified.

In a second embodiment, a serializer/deserializer interface is used. Messages are wrapped with a new layer that includes the information needed for the calculations (producer time stamp and id) within the existing message payload. An existing serializer/deserializer interface is used, without modifying the client code. In one variation, messages are wrapped in a new envelope (ISO network stack style) with an informative header, or alternately use the existing serialization schema (Avro, Thrift, etc.) to store/retrieve this data. In an alternate embodiment, message offsets are used instead of, or in addition to, producer time stamps.

End-to-End Metrics Collection and Query

In one embodiment, the following types of statistics are shown in the User Interface (UI):

Audit results, such as discrepancies in number of messages produced and consumed (duplicates, lost messages, etc.).

Latency and other metrics that need correlation between different/multiple points in the system. For example: end-to-end latency, optionally across clusters; message size distribution over same time buckets used to show latency and audit discrepancies (e.g., if we want to correlate message sizes to audit results).

JMX metrics that are already collected on brokers and clients.

Errors

There are a lot of metrics that are already being collected on brokers, consumers, and producers in Kafka. Those belong to the type #3, and in one embodiment, different types of errors are added to Kafka metrics. Kafka Metrics are collected independently on servers and clients, over local time intervals, and there is no notion of tracking a message end-to-end. However, statistics of type #1 and #2 cannot be collected using existing mechanisms in Kafka—the present invention correlates statistics between multiple points in the system, optionally across clusters. For audit results, the number of messages produced over a time interval are counted, and then identification is performed to determine how many messages from exactly the same set being consumed to find audit discrepancies. For end-to-end latency, each message is tracked end-to-end. For some other metrics like latency and message size distribution, one embodiment collects them over the same time intervals (same sets of messages) that were used to collect audit discrepancies so latency can be correlated to audit discrepancy to possibly message size distribution. In the below discussion, #1 and #2 metrics are referred to as Audit Metrics.

Architecture Overview

Figure 2:
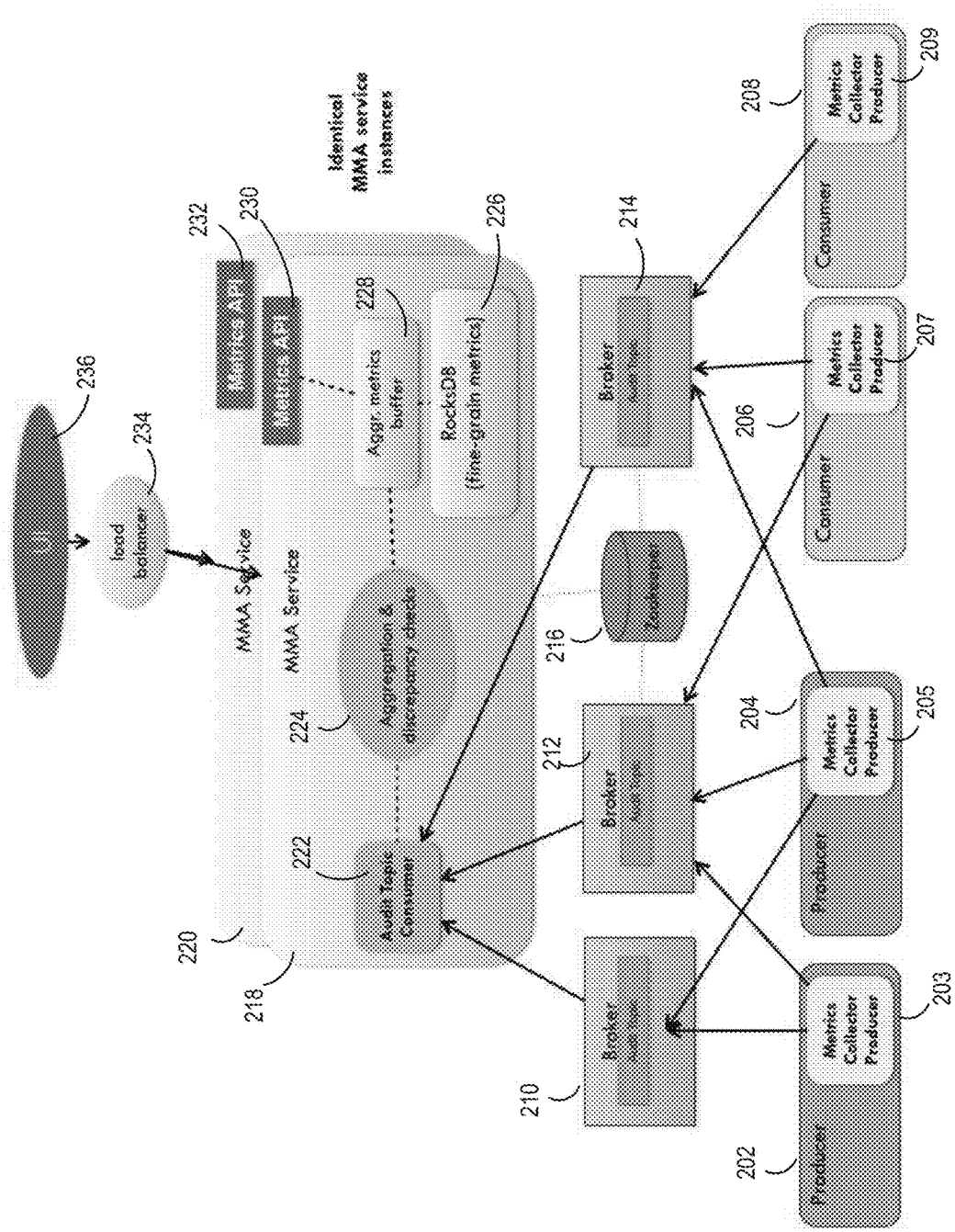
FIG. 2 is a diagram of a stream verification system according to an embodiment of the present invention.

FIG. 2 is a diagram of the architecture of a metric collection and verification system according to an embodiment. Producers 202 and 204 have program modules 203 and 205 downloaded for metrics collection. Similarly, consumers 206 and 208 have metrics collection modules 207 and 209. Although two of each are shown for illustration, the system applies to any number of producers and consumers. The metrics are provided to brokers 210, 212, 214 which propagate them to an audit topic consumer 222 in MMA Service 218. One or more additional MMA Service 220 is provide to share the load. The brokers communicate with Kafka Zookeeper 216 as described above in the prior art.

An aggregation module 224 does aggregation and discrepancy checks, and forwards the aggregated metrics to an MMA backend service. In one embodiment, the MMA backend service includes an aggregated metrics buffer 228, which uses a RocksDB 226 for storing the fine-grain metrics. The aggregated metrics are made available through a metrics API 230, with an additional API 232 for MMA service 220. A User Interface 236 is able to access the MMA services through a load balancer 234.

Metrics are collected at multiple points: on producers, consumers, and brokers. Interceptors are added in producers and consumers to collect Audit Metrics. In one embodiment, interceptors are added for Audit Metrics to brokers. The timestamp field in Kafka message (KIP-32) is used, set by the producer, to identify and correlate messages end-to-end, including across clusters. To decrease the amount of data sent around, the interceptors (producers/consumers) do initial aggregation of audit metrics into configurable-length time buckets and write aggregated stats into the Audit Topic. The time buckets are derived from timestamps in a Kafka message, set by a producer. The interceptor time bucket size is the smallest time window length that is exposed to the UI/REST API. The behavior of the audit metrics collection is encapsulated into Metrics Collector class. Metrics Collector class provides a simple API for consumer/producer to record a sample, it aggregates the samples into time buckets, one bucket per (topic, partition). Metrics Collector extends the KafkaProducer class which gives a background 10 thread to publish bucketed metrics to the Audit Topic.

In one embodiment, a pluggable metrics reporter publishes Kafka Metrics to Metrics Topic. (this preserves the stats for the same period of time as audit data). In another embodiment, a MMA service obtains Kafka Metrics from JMX reporter (this embodiment shows just the latest stats). In both embodiments, an additional reporting path to the UI is provided, separate from audit data collection and aggregation. The following discussion describes the design for audit metrics monitoring and reporting.

MMA is a metrics service that users deploy to get metrics results to the UI or to the external service through REST API. MMA service contains a materialized view of the Audit Topic persistently stored in a RocksDB database. The materialized view is ephemeral so that it can be reconstructed by scanning the Audit Topic (or Compacted Audit Topic). RocksDB stores metrics data aggregated to enough info/granularity that the MMA service needs to expose. RocksDB is embedded on the same node that runs MMA service.

Queries to the MMA service are all served from the RocksDB. In one embodiment, all aggregated metrics data are stored in one RocksDB (single node). For load balancing and availability, users run multiple MMA instances behind a load balancer. In this embodiment, all MMA instances are equal—they each have all the data for the Kafka cluster. In an alternate embodiment, the materialized view is shared across MMA instances. For efficient queries on larger time intervals, one embodiment stores several RockDB tables—one for minute time interval, for day time interval, etc.

The following discussion sets forth two embodiments for loading and managing the queriable materialized view. 1) MMA service consumes Audit Topic and writes into RocksDB; if RocksDB is accumulated, then it is also loaded from Audit Topic; and 2) MMA service consumes Audit Topic and writes to the Compacted Audit Log; RocksDB is loaded from the Compacted Audit Log, and the accumulated RocksDB is loaded from the integrated Compacted Audit Log (consumed from Compacted Audit Log).

Metrics Collection

Metric collection is enabled at multiple points on a message path from producers to brokers to consumers. In a first embodiment, metrics are collected on producers and consumers. The behavior of collecting metrics is encapsulated into Metrics Collector class. Metrics Collector aggregates metrics into short time intervals of length sample period. This is the smallest time window that could be exposed from Metrics Service. Components are able to separate aggregation of metrics per topic, partition or whatever more filtering is required by Metrics Service. Based on current requirements, producers and consumers aggregate metrics per topic, partition. Metrics Collector publishes aggregated metrics to Audit Topic. Metrics Collector exposes a simple API for a component to record a metric: void recordMetric(BucketKey bucketKey, Metric metric);

Each component in the system that collects metrics has its own type derived from Metric. Metric interface includes a method to query for the timestamp that will be used to identify a sample interval to which this metric belongs to. Also, there is a corresponding AggregatedMetric type that knows how to aggregate the metrics.

Terminology/Configuration Parameters:
  Sample period is a size of a time bucket where Metrics Collector aggregates samples.
  Audit sample period is a size of a time bucket used in the Audit Message sent to the Audit Topic. Audit sample period must be a multiple of sample period, or it could equal to sample period. Audit sample period=N*sample period, where N>=1.
  Lag period count is a number of audit sample periods that Metrics Collector waits before sending aggregated metrics to the audit topic. Basically, the system will not send aggregated metric until it has started aggregating metrics for the time period "lag period count" ahead. This metric determines the expected time the Metrics Collector sends the Audit Message for the same client, topic, partition, audit sample period.
  Audit message frequency: How often Metrics Collector sends an audit message to Audit Topic. This parameter is completely independent from lag period count; since the system can frequently send buckets (if there is any new data) that are aged the required amount of time.

The system differentiates between sample period and audit sample period to allow two types of granularity for the metrics collection: e.g. in one embodiment audit related metrics with 1-minute granularity and latency and message size distribution related metrics are provided with a larger time granularity, such as 5 minutes. In one embodiment, configuration where both granularities are the same are used. The reason for choosing different granularities is to allow space usage savings for the Audit Topic (see estimates below).

Metrics Collector keeps a map of circular arrays of time buckets of size audit sample period, one array of time buckets per bucketKey (in one embodiment, producers and consumers use topic, partition as bucketKey). Each time bucket contains N sub-buckets of sample period size. An array of time buckets includes the current time bucket and a few of the most recent time buckets (or just the current time bucket for a configuration where circular array size to 1). The type of a time bucket includes the start timestamp of the bucket, aggregated latency and message size metrics, and array of sub-buckets of aggregated audit metrics. When a metric gets recorded, the system identifies the corresponding time bucket by timestamp and bucketKey, and add/merge the metric to the aggregated metric in the time bucket. If the timestamp belongs to the time interval that is more recent than any other time bucket in the circular array, the oldest bucket is thrown away and a new time bucket is started. Each component in the system that collects metrics uses its own type for parameter metric. Each component collects some or all of the following metrics:
  Audit-related metrics, aggregated per sample period: message count, bytes, aggregate CRC, average latency, average message size.
  Latency and message size distributions, aggregated per audit sample period.

Once an audit message is sent, Metrics Collector may receive a sample for the corresponding time bucket that was already sent. In this case, Metrics Collector will start collecting samples into that time bucket again, and send it later, resulting in more than one audit message per client, topic, partition, time bucket.

Metrics Collector extends KafkaProducer for publishing aggregated samples into Audit Topic. KafkaProducer has a background I/O thread that transmits messages to the brokers. There is one more timer thread that periodically (on configured frequency or when circular array entries need to be over-written) queues audit data from time buckets for publishing to Audit Topic. An audit message is sent even if a corresponding time bucket has no samples, i.e. producer did not produce any messages during that time. "Empty" messages will help detect loss of audit data in the event of producer/consumer crash or shutdown before sending cached audit data. Thus, Metrics Collector adds 2 threads to the clients—one background I/O thread for transmitting audit messages to the brokers and one timer thread for queuing adding messages for transmission. An alternative embodiment queues messages on the caller thread in recordMetric( ) in the event when dirty time buckets need to be cleared for the next time intervals.

Latency Measurements and Aggregation

Two embodiments of providing latency metrics are: min/max/average and latency percentiles.
  min/max/average latency. Collects and aggregates min, max and average latency per time bucket. Audit Topic Message Schema (described above): "latency_bin"=0 for min, 1 for max, and 2 for average; "count" will have actual latency value. Per-time-bucket latency data size=3*2*sizeof(long)=48B.
  Latency percentile. This embodiment collects enough latency data to enable a query of the latency histogram and latency percentiles (at least 25th, 50th, 90th, 95th, and 99th). There are a few existing algorithms that are designed to be fast and require limited space: q-digest and t-digest. t-digest does not require providing an upper limit on a latency value. The main difference from q-digest is that the accuracy for estimating q-quantile is relative to $q(1-q)$, and also t-digest is better in terms of accuracy vs. size tradeoff. The accuracy/size tradeoff is controlled by setting a single compression parameter. With t-digest, the aggregated latency in the time bucket is represented as a list of centroids, where centroid is (mean, count). In the t-digest java implementation that number of centroids will be normally less than 10*compression, but could be up to 100*compression. Recommended compression value is 100.

Message Size Measurements and Aggregation

Similar to latency, the system collects: 1) min/max/average message size; 2) message size distributions; 3) message size percentiles. In one embodiment, message size distribution is used. For 40 buckets for message size distribution (not percentiles), the buckets range could be dynamic (depending on distribution). The expected message size distribution metrics data size=40*2*sizeof(long)=640B Audit Topic Message Schema Audit Topic message contains one or more aggregated metrics, which could belong to the same or different topic, partition, time bucket.

---

Avro schema:

---

```
{
"type": "record",
"name": "AuditMessage",
"fields" : [
{"name": "source_id", "type": "string"}, // ID of the source of the message (e.g., producer ID, consumer ID)
{"name": "host_id", "type": "long"}, // Host ID
{"name": "source_type", "type": "int"}, // where in the system metrics got collected (e.g. producer, consumer)
{"name": "source_group", "type": "string"}, // ID of the group (consumer group, producer group/program)
{"name": "timestamp", "type": "long"}, // Audit message timestamp (time the message was sent from the Metrics Collector)
{"name": "topics", "type": "map", "values": { // per topic
"type": "record",
"name": "topic_audit_data",
"fields": [
{"name": "topic_name", "type": "string"},
{"name": "partitions", "type": "array", "items": { // per partition
"type": "record",
"name": "partition_audit_data",
"fields": [
{"name": "partition_number", "type": "long"},
{"name": "metrics", "type": "array", "items": { // list of aggregated metrics, per sample period
"type": "record",
"name": "metric",
"fields": [
{"name": "bucket_timestamp", "type": "long"}, // bucket identifier
{"name": "sample_period", "type": "long"}, // normally same length for all buckets, but could be useful?
{"name": "sub_buckets", "type": "array", "items": { // array of finer-grain metrics aggregates
{"name": "subbucket_timestamp", "type": "long"} // sub-bucket identifier; will not record length (=sample_period / sub_buckets.length}
{"name": "count", "type": "long"}, // message count
{"name": "bytes", "type": "long"}, // number of bytes
{"name": "flags", "type": "int"}, // for detecting loss of audit messages, possibly for some other info
{"name": "aggregate_crc", "type": "int"}}, // aggregate checksum for all the messages (Discussion here: Architecture and Algorithm Proposal (10/21/15 Strawman))
{"name": "message_size_dist", "type": "array", "items": { // distribution of message sizes:
"type": "record",
"name": "size_bucket",
"field": [
{"name": "size_bin", "type": "long"}, // names are general, but if we use t-digest, this is "mean"
{"name": "count", "type": "long"}]},
{"name": "latency_distribution", "type": "array", "items": { // latency distribution
"type": "record",
"name": "latency_bucket",
"field": [
{"name": "latency_bin", "type": "long"}, // names are general, but if we use t-digest, this is "mean"
{"name": "count", "type": "long"}]}}}]}}]}}]
}
}
}
]
}
```

Dealing with Loss of Audit Messages

If a process (e.g. producer, consumer) fails or shuts down, the system will lose the last X minutes of locally aggregated stats that has not yet been sent to the Audit Topic. In one embodiment, a mechanism is provided to detect a loss of audit data in order to differentiate between losing audit data and actual sampled data. MetricsCollector sends audit messages to the Audit Topic even if corresponding time buckets do not contain any samples, then a consumer of Audit Topic will detect a possible loss of data for a time interval that is not recorded in audit messages.

Metrics Collection on Producer

Each message sent by producers includes a timestamp. The timestamp is an ID which is used to track the message end-to-end. This is covered by KIP-32. The Producer will own MetricsCollector object. Producer could call MetricsCollector::recordMetric(bucketKey=topic,partition) in the callback from send( )method.

The below shows what producer needs to record per message send. This defines a class extended from Metric.
  Message size in bytes
  CreateTime timestamp that is included in message (KIP-32)
  Message CRC
  Aggregated metric includes the following fields:
    message_count: Number of messaged produced for this topic,partition
    bytes_count: Number of bytes produced for this topic, partition
    aggregate_checksum: Aggregated checksum for all the messages for this topic,partition.
    array_of_message_size_buckets: For a preconfigured size array, where each slot is of type (size range, message count). The system starts recording each message size into its own slot, but when there are more message sizes, it will start merging slots with shortest distance.

Serialization of Producer Aggregated Metric into Audit Topic Message
  timestamp is a current time when message gets serialized.
  source_group is a program or an application id in one embodiment. Alternately, this field can be ignored if type=producer.

Metrics Collection on Consumer

The Consumer owns MetricsCollector object. Consumer calls MetricsCollector::recordMetric(bucketKey=topic,partition) at the point when the message is returned from the poll( ) Consumer will record metric using the timestamp from the message. The information that will be passed to recordMetric( ) is:
  CreateTime timestamp from the consumed message
  Timestamp the message was returned from the poll( )
  Message CRC
  Message size in bytes
  Aggregated metric includes the following fields:
    message_count: Number of messaged produced for this topic,partition
    bytes_count: Number of bytes produced for this topic, partition
    aggregate_checksum: Aggregated checksum for all the messages for this topic,partition.
    array_of_message_size_buckets: same as producer stats.
    array_of_latency_buckets: These are the buckets to calculate latency percentiles. Alternately, the "quantile digest" approach can be used for distributed gathering of percentile info (Decentralized percentile aggregation).

Serialization of Producer Aggregated Metric into Audit Topic Message
   timestamp is a current time when message gets serialized.
   source_group is consumer group.
Audit Topic
   Audit Topic is a log of metrics collected across the system (one embodiment: all producers and consumers). Message format is described above. The system partitions the audit topic by client ID: topic.
Metrics Service
   In one embodiment, users deploy metrics service to get results to the IO or the external service through REST API. To ensure efficient metrics queries, all the audit data is loaded into RocksDB and served from there. For one embodiment, all metrics data is loaded into one RocksDB database embedded on the node that runs MMA service. For availability, users may run multiple MMA instances behind a load balancer. In one embodiment, all MMA instances will be equal, and they each will have all the data for the Kafka cluster.
This application describes two embodiments for MMA backend storage:
   RocksDB is loaded directly from the Audit Topic. If all MMA service instances are lost, the system can rebuild RocksDB from Audit Topic.
   MMA service aggregates/compacts audit data from Audit Topic into Compacted Audit Log. RocksDB is loaded from (or re-constructed in the event of failure) Compacted Audit Log.
RocksDB Tables
   In MMA service, all metrics data are loaded into RocksDB and MMA service queries are served from there. RocksDB supports efficient range scans by using prefix-based seeks. Keys are provided with a fixed-size prefix that includes fields which can be quickly filtered. Multiple tables are used, where each table is optimized for a specific type of query. This is the list of tables for queries on fine-grain (sample period) time intervals based on Example query results and Example use cases for Performance/Audit.

TABLE 1

Audit results per time buckets

Keys are constructed to efficiently seek to a particular <type (producer/consumer), producer/consumer group ID, topic, partition> and a time bucket. Time bucket granularity is sample period.
Key: <type (producer/consumer), producer/consumer group id, topic, partition, time bucket>, where the whole key is fixed length.
Value: number of messages, flags
Supported queries:
'flags' field contains info such as CRC did not match (can be shown in UI even if number of messages matches), audit data is potentially incomplete (if detected that an audit message was lost).
Audit results over time: Seek to <producer, producer ID, topic, partition, start time bucket> and read keys up to end time bucket;
Seek to <consumer, consumer group ID, topic, partition, start time bucket> and read keys up to end time bucket. Dependencies: requires info about topic <=> consumer group and topic <=> producer ID.
Audit heat map: Same as above for desired consumer group ID.
Distribution of message count by partition.

TABLE 2

Bandwidth results over time (time stamps, not buckets)

Since consumers are bucketing metrics per producer timestamps, one embodiment shows consumer/producer bandwidth based on timestamps, not buckets. Keys are constructed to efficiently seek to a TABLE 2-continued Bandwidth results over time (time stamps, not buckets)

particular <type (producer/consumer), producer/consumer group ID, topic, partition> and a timestamp.
Key: <type (producer/consumer), producer/consumer group id, topic, partition, timestamp>, where the whole key is fixed length.
Value: number of bytes, number of messages
Supported queries:
Producer bandwidth: Seek to <producer, producer ID, topic, start time bucket> and read keys up to end time bucket;
Consumer bandwidth: Same as producer but for consumer type and consumer group ID.

TABLE 3

Message size distribution per time buckets

Keys are constructed to efficiently seek to a particular <type (producer/consumer), producer/consumer group ID, topic, partition> and a time bucket.
Key: <type (producer/consumer), producer/consumer group id, topic, partition, time bucket>, where the whole key is fixed length.
Value: message size buckets
Supported queries:
Message size distribution: Seek to <producer, producer ID, topic, partition, start time bucket> and read keys up to end time bucket;
Seek to <consumer, consumer group ID, topic, partition, start time bucket> and read keys up to end time bucket.

TABLE 4

Latency percentiles and distribution per time bucket

Keys are constructed to efficiently seek to a particular <topic, partition, consumer group ID> and a time bucket.
Key: <topic, partition, consumer group id, time bucket>, where the whole key is fixed length.
Value: latency percentile buckets (or min/max/ave)
Supported queries:
Latency distribution: Seek to <topic, consumer group id, start time bucket> and read keys up to end time bucket;
Distribution of 95th percentile (or any other percentile) of latency by partition.

Rolled Up Audit Topic
   Rolled up Audit Topic is a Kafka topic that rolls up and aggregates metrics data into rolled up period time intervals. A special case of Rolled up Audit Topic is a topic that rolls up to a sample period time interval—it keeps the same time granularities as Audit Topic, but does a bit more merging, same as other rolled up topics. In one embodiment, Rolled up Audit Topic keeps fine granularity (sample period) of audit metrics data, and rolls up only latency and message size distribution metrics.
How Audit Messages Get Aggregated into Rolled Up Audit Topic:
   In one embodiment:
   consumer group: all consumers that belong to the same consumer group are merged into the same compacted audit message for rolled up time bucket with a list of topics and partitions.
      This provides one Rolled up Audit Topic message per producer/consumer group id, topic, partition, rolled up bucket of size rolled up period. However, each such message will also contain an array of sample period size buckets of audit data (referred to as audit data sub-buckets).
   Remove all zero time periods, but collect and keep information of possible incomplete audit data (lost audit messages).

Timestamps: keep the last timestamp that fits into the rolled up time bucket.

---

Avro schema:

```
{
"type": "record",
"name": "RolledUpAuditMessage",
"fields" : [
{"name": "source_type", "type": "int"}, // where in the system metrics
got collected (e.g. producer, consumer)
{"name": "source_group", "type": "string"}, // ID of the group
(consumer group, producer group/program)
{"name": "timestamp", "type": "long"}, // Latest timestamp of all
Audit Topic timestamps that were aggregated into this
RolledUpAuditMessage
{"name": "topics", "type": "map", "values": { // per topic
"type": "record",
"name": "topic_audit_data",
"fields": [
{"name": "topic_name", "type": "string"},
{"name": "partitions", "type": "array", "items": { // per partition
"type": "record",
"name": "partition_audit_data",
"fields": [
{"name": "partition_number", "type": "long"},
{"name": "metrics", "type": "array", "items": { // list of aggregated
metrics, per rolled up sample period
"type": "record",
"name": "metric",
"fields": [
{"name": "bucket_timestamp", "type": "long"}, // bucket
identifier
{"name": "sample_period", "type": "long"}, // normally same
length for all buckets, but useful if we want to dynamically change it
{"name": "audit_metrics", "type": "array", "items": { // array of
fine-grain audit metrics
{"name": "subbucket_timestamp", "type": "long"} // sub-bucket
identifier
{"name": "subbucket_period", "type": "long"}, // length of
sub-bucket time interval
{"name": "msg_count", "type": "long"}, // message
count
{"name": "bytes", "type": "long"}, // number of
bytes
{"name": "flags", "type": "int"}, // incomplete audit data, etc.
{"name": "aggregate_crc", "type": "int"}}, // aggregate
checksum for all the messages (Discussion here: Architecture and
Algorithm Proposal (10/21/15 Strawman))
{"name": "message_size_dist", "type": "array", "items": { // distribution
of message sizes:
"type": "record",
"name": "size bucket",
"field": [
{"name": "size_bin", "type": "long"}, // names are
general, but if we use t-digest, this is "mean"
{"name": "count", "type": "long"}]},
{"name": "latency_distribution", "type": "array", "items": { // latency
distribution
"type": "record",
"name": "latency_bucket",
"field": [
{"name": "latency_bin", "type": "long"}, // names are
general, but if we use t-digest, this is "mean"
{"name": "count", "type": "long"}]}}}]}}}]}}]
}
}
}
]
}
```

In different embodiments, audit metrics array keeps all audit data, or only sample period buckets where discrepancies happened.

Audit Topic and RocksDB as a Query Able View

Figure 3:
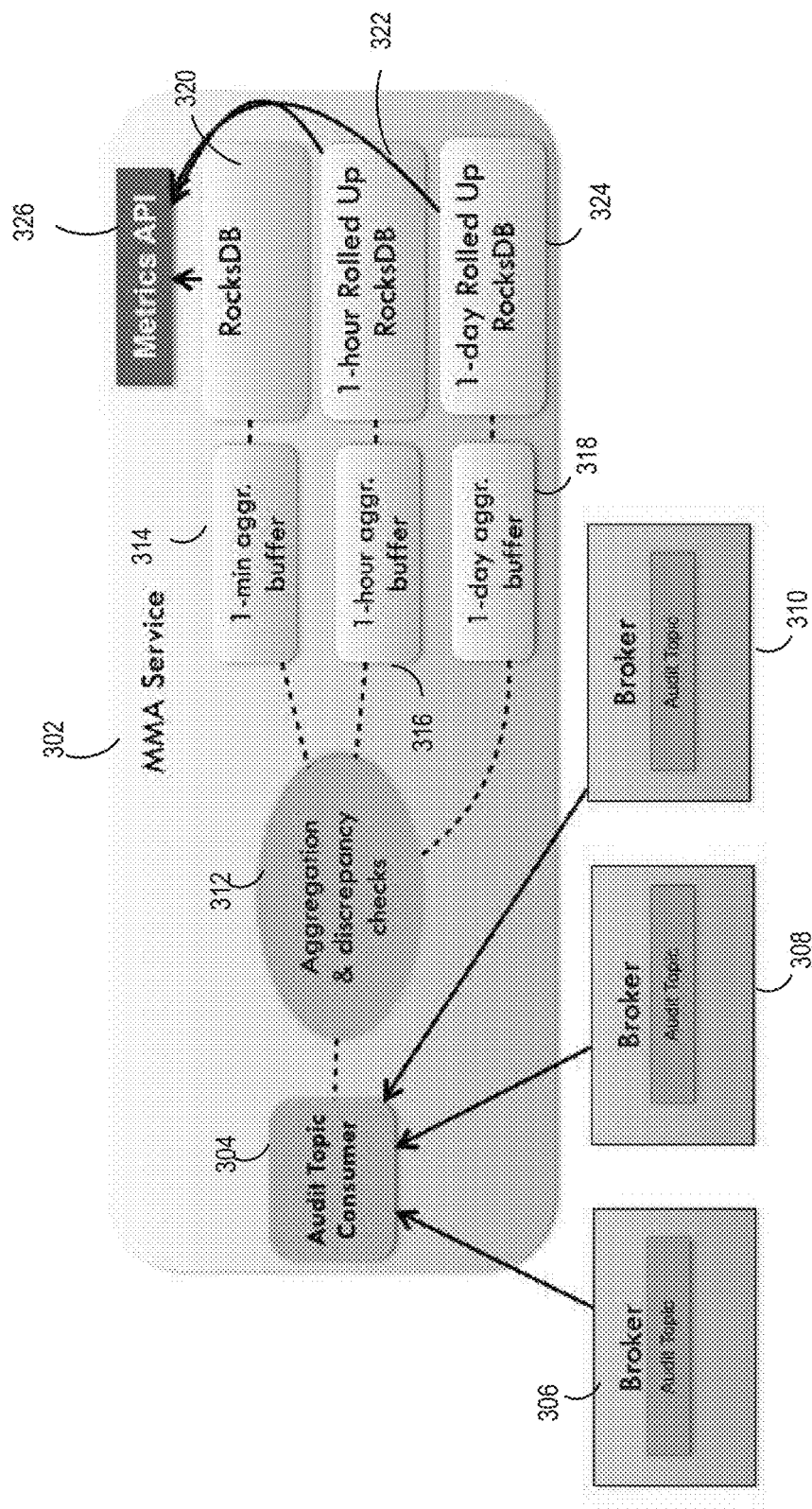
FIG. 3 is a diagram of a MMA service according to an embodiment of the present invention.

In one embodiment shown in FIG. 3, all the metrics data is stored in the smallest granularity (sample period, e.g. 1 min) in Audit Topic. MMA service 302 runs Audit Topic Consumer 304 which consumes from Audit Topic in the brokers 306, 308, 310. Module 312 does audit discrepancy checks, checks for incomplete audit data, etc., then aggregates data for writing to RocksDB 320, and also aggregates data and writes to 1-hour Rolled Up RocksDB 322 and 1-day Rolled Up RocksDB 324. Buffers 314, 316 and 318 are used in front of RocksDB, because the buffer size will be one of the comparison points. The data is made available through metrics API 326. The advantage of this embodiment is simplicity and least complexity of the implementation. However, this design requires most of space on brokers for Audit Topic to keep fine-grain metrics for the whole duration of time.

Using Rolled Up Audit Topics

Figure 4:
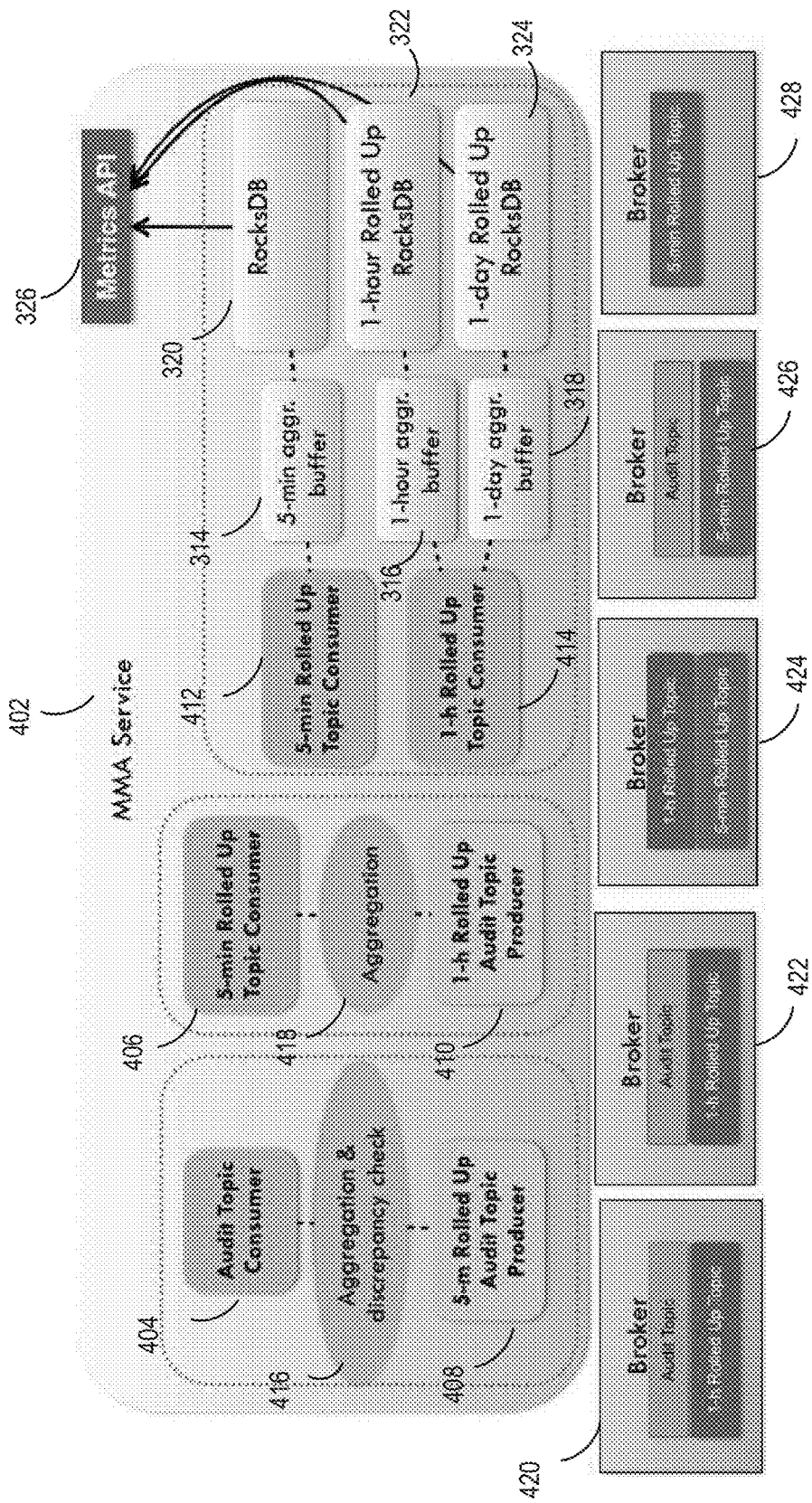
FIG. 4 is a diagram of a MMA service according to an alternate embodiment of the present invention.

In one embodiment shown in FIG. 4, Audit Topic Consumer 404 stores only recent data (e.g. 1 day), and MMA service 402 will aggregate it, do audit discrepancy checks, and store it in a more compacted way in 5-min Rolled Up Audit Topic Consumer 406, and few other Rolled Up (to a more coarse granularity) Audit Topics. RocksDBs will be loaded from Rolled Up Topics. There are several options with regards how many and which Rolled Up Topics to use. FIG. 4 shows: 5-min Rolled Up Audit Topic and 1-hour Rolled Up Audit Topic for both producers (408, 410) and consumers (412, 414).

MMA service consumes→aggregates, does audit discrepancy checks (416, 418)→publishes aggregated metrics to 5-min Rolled Up Audit Topic. MMA service then also runs a consumer of 5-min Rolled Up Audit Topic, does aggregation, and publishes to 1-hour Rolled Up Aggregate Service. To load up RocksDBs, MMA service runs 5-min and 1-hour Rolled Up Topic Consumers 412, 414, and write to RocksDB tables: Fine-grain RocksDBs 320 are loaded from 5-min Rolled Up Audit Topic, and 1-hour and 1-day Rocks DB (322, 324) are loaded from 1-hour Rolled Up Audit Topic. (Optionally, a 1-day Rolled up Audit Topic could also be provided). This embodiment requires much less space usage on brokers. Brokers 420, 422, 424, 426 and 428 employ a variety of audit topic roll up time periods.

Aggregating Data from Audit Topic

When the system reads from Audit Topic into RocksDB or Rolled Up Audit Topic, it needs to determine loss of audit data and remove zero message time buckets. Since producers/consumers send audit data to Audit Topic even if there are no messages produced/consumed, if it stops seeing consecutive time buckets from the same consumer/producer, there is an audit message loss. Producer/consumer may quickly shutdown and restart, so there may be lost audit data but there are no holes in time buckets. In this case, producer/consumer include the info that they just started in a flag for the first time bucket. The system marks this and the previous time bucket as having possibly incomplete data.

When the system is consuming audit messages from Audit Topic, it keeps track of all producer/consumer id, topic, partition last time bucket ID, and uses a timeout for waiting for the next time bucket for that producer/consumer id, topic, partition. After timeout, it marks the last time bucket as possibly incomplete. This will also take care of holes in time bucket IDs.

It also checks audit discrepancy, and if there is discrepancy (even if number of producer and consumer messages match) add this info into the flag (in RocksDB table or Rolled Up Audit Topic message):

Merge all audit messages for the same producer, topic, partition, time bucket: aggregate all checksums, add number of messages Merge all audit messages for the same consumer group, topic, partition, time bucket: aggregate all checksums, add number of messages If number of messages does not match: set discrepancy flag for consumer group, topic, partition, time bucket Otherwise, compare checksums. If they do not match: set discrepancy flag for consumer group, topic, partition, time bucket Scaling KV Store In one embodiment, the system keeps all the data in RocksDB tables on a single node by keeping fine grain data for a limited time, and then keeping metrics data in coarser granularity for a longer time.

Fault Tolerance

If one of the MMA service nodes is lost, there are multiple embodiments for handling this:

copy RocksDB tables from other MMA service nodes—in that case take a snapshot, get the state of consumers, and copy.

load RocksDB tables from Audit Topic or Rolled Up topics, depending on a design we choose.

MVP for MMA Service

In one embodiment, an implementation enables queries described in Example query results. The system collects:

Min/max/average latency

Message size distribution

Audit discrepancies bandwidth

Interceptors are implemented on producers and consumers to collect metrics. Specifically, metrics are aggregated as follows: metrics required to identify audit discrepancies (number of messages, CRC) are aggregated into sample period time intervals and metrics for message size and latency distributions are aggregated into audit sample period time interval. Metrics are published to Audit Topic.

As shown in FIG. 2, MMA service provides metrics results to UI and any external services through REST API. MMA service serves all the queries from RocksDB tables. There are only RocksDB tables containing fine-grained metrics—same granularity as collected from producers or consumers. For load balancing and availability, users run multiple MMA instances behind a load balancer. Each MMA instance is equal, and has all the data for the Kafka cluster. MMA service runs Audit Topic Consumer, does discrepancy checks and aggregation into consumer groups, and loads metrics data into RocksDB.

In one embodiment, there is a functionality to not require all the data to be stored in RocksDB and provide the ability to fetch old data from audit topic. In this case, if MMA service gets a query for timestamps that are not in RocksDB, the are fetched from Audit Topic.

Detecting Lost/Duplicate Audit Data

There are situations when collected audit metrics are lost or delivered incorrectly to the C3 app (C3 is referred to earlier as MMA, the terms are used interchangeably):

Producer/Consumer fails which causes loss of cached metrics not yet published to Audit Topic.

Audit Topic producer fails to publish audit message:
  a. Interceptor fails to add audit metric to time bucket/or some other failure to accumulate audit metrics. The most common reasons:
    i. Invalid message timestamp. This is either corrupt message (which will be detected by CRC mismatch) or bug on producer in assigning timestamps.
    ii. Out of memory errors, in which case clients are in trouble anyway and most likely becomes case #1.
  b. Corrupt audit message.
    i. This is treated the same way as loss of audit message (e.g., due to failure to publish to audit topic).

Duplicate audit message.
  a. Example: retry after a network error where the audit message was already appended to the log on the broker.

Detecting that C3 App has Incorrect Audit Data for a Topic/Partition

In one embodiment, one, two or all three of the following three mechanisms are used. Using all three mechanisms maximizes the detection of loss/duplicate/corrupt audit data in all failure scenarios.

1. Session ID. This is a UUID generated for each client audit session and is included in the AuditMessage. Session ID is generated on client startup using pseudo-randomly generated UUID (UUID.randomUUID). Session ID is used to detect possible loss of audit data due to client failure. Client failure may cause loss of cached metrics not yet published to Audit Topic.

2. Assigning sequence numbers to Audit messages per client/topic/partition. A sequence number is included in the AuditMessage. When a client starts and its interceptor gets initiated, the interceptor does not know about a topic/partition until the first time it observes metrics for the topic/partition. The first time the Interceptor records a metric for a topic/partition, the first AuditMessage for the topic partition will contain sequence number 0. All subsequent AuditMessages for the topic/partition will contain monotonically increasing sequence numbers. Sequence number will be used to detect a loss of audit messages at times when client is running (Session ID does not change). Scenarios include: Audit Topic Producer fails to publish audit message, corrupt audit message (we treat as lost), detecting duplicate audit message. C3 app keeps track of sequence numbers per client/topic/partition. There is a timeout when a sequence number can be declared missing. Timeout is no more than a couple of sampling intervals. In one embodiment, sequence ID is used to detect client fail/restart (in place of Session ID): one embodiment assigns a negative sequence ID when client starts. However, for several failure scenarios—client failure/restart plus losing one or more initial audit messages, we may not be able to detect these scenarios. Thus, in one embodiment, Session ID is used for client failure detection.

3. C3 interceptor publishes AuditMessage for idle sample intervals (zero message counts), per topic/partition. If client does not produce/consume any messages per topic/partition, Interceptor sends one AuditMessage with zero message count per topic/partition with a sequence number set (called empty Audit Message). Without this mechanism, using sequence numbers alone will not detect the loss of audit data just before the client goes idle. So if the client stops producing/consuming (forever or for a long time), we will need a client to continue producing/consuming before we can detect missing sequence numbers. This mechanism does not replace Session ID, because it alone will not detect client fail/restart within the same sampling period, where there will not be a gap in C3 app receiving audit messages from client/topic/partition, but audit data may still be lost.

The above mechanisms detect loss of audit data in all failure scenarios, but it cannot say for sure that audit data is lost. Consider this example: Client fails, but there is actually no cached audit data. In one embodiment, keeping track of client offsets is done. One approach for minimizing the number of cases C3 app detect the loss of audit data that is actually not lost is to include 'shutdown' flag to the last AuditMessage per topic/partition on graceful client shutdown. Once C3 app sees 'shutdown' flag, it will stop tracking audit message arrivals for client/topic/partition.

Audit Topic consumer on C3 app side detects audit data loss as follows.
- C3 app keeps track of sequence numbers per client/topic/partition. There is a timeout when a sequence number can be declared missing. Timeout is no more than couple of sampling intervals.
- C3 app keeps track of the time of the most recent audit message per client/topic/partition. There is a timeout when client can be declared as failed. If C3 app received audit message with 'shutdown' flag set, then it stops tracking time for this client/topic/partition.
- If C3 app detects sequence number missing or client failure, then it declares that audit data may be lost.

Failure Scenarios and their Detection:

| Failure Scenario | Detection |
| --- | --- |
| 1. Client fails and cached audit data is lost; Client does not restart in the same time window. | Detects audit data is lost by timing out on waiting for an audit message for given client/topic/partition. |
| 2. Client fails and cached audit data is lost; Client restarts instantly. | Detects audit data is lost by seeing Session ID change and not seeing 'shutdown' message for this client/topic/partition. |
| 3. Client fails but there is no cached audit data; Client either restarts instantly or after some time | Correct audit data identified as incorrect - Detects audit data is lost by seeing Session ID change or timing out on waiting for an audit message for given client/topic/partition. |
| 4. Client shuts down gracefully, but empty AuditMessage with 'shutdown' flag is lost. | Correct audit data identified as incorrect - same as case #3. |
| 5. Client shuts down gracefully, but the last AuditMessage with audit data and 'shutdown' flag is lost/corrupted. | Same case as #1 or #2, depending how fast client starts again. Detects as in #1 or in #2. |
| 6. First AuditMessage with audit data (after client restart) is lost/corrupted. | Detects audit data is lost by timing out on waiting for sequence number '0'. Note that since the first audit message per topic/partition (since client startup) can only happen the first time the Interceptor observes a metric for a topic/partition (otherwise, it does not know about topic/partitions). So there is no use-case when the first audit message does not contain any audit data. |
| 7. Audit message with audit data is lost/corrupted while client is producing/consuming (non-idle) | Detects audit data is lost by timing out on sequence number. |
| 8. Audit message without audit data (idle window) is lost while client is idle or producing/consuming with some idle intervals. | Correct audit data identified as incorrect - Detect audit data is lost by timing out on sequence number. |
| 9. Any of the above scenarios but with multiple messages lost/corrupted. | Detected separately, as combination of the above use-cases |
| 10. C3 app receives duplicate audit message | Detected as duplicate sequence number |

In one embodiment, the C3 app will not be able to distinguish between audit data is lost vs. audit data may be lost. Thus, the system shows that audit data may be lost in every case.

Detecting which Time Windows have Lost Audit Data

The above mechanisms allow detecting the loss of audit data, but will not show which time windows contain the audit data. Below are several use-cases illustrating this:

Non-buffering clients that assign timestamps to local time just before messages are sent to KafkaProducer. Or clients that do not set timestamps, and KafkaProducer assigns timestamps in send( ) method. There will be a small or no jitter in timestamps, probably no more than one sample period (our sample periods are in order of minutes). In this case, when C3 app detects missing audit data, we can bound missing audit data to +− few sampling periods.

there could be situations where we can see higher timestamp jitter in non-buffering clients if some messages get stuck in network layer, since the interceptors record metrics on the acknowledgement from the brokers. The jitter could be a couple of days.

Buffering clients, where client assigns timestamps much earlier than records are actually sent to Kafka cluster. It is still possible that records will be sent in reasonable order of creation, so that even though timestamps are not in sync with producer current time, but jitter is not high.

MirrorMaker. This case actually may have several 'streams' of timestamps, so could be high variation in timestamps.

Client assigning bad timestamps, so they are all over the place.

In one embodiment, the C3 interceptor includes the following information in AuditMessage:
- Minimum window timestamp of the last N sampling periods for this client/topic/partition
- Maximum window timestamp of the last N sampling periods for this client/topic/partition When C3 app detects a missing sequence number Si, it will look in to min and max window timestamp of the AuditMessage with the following sequence number Si+1 and declare that audit data is possibly lost in time range (minimum window timestamp, maximum window timestamp)i+1. N is configurable. If C3 app detect K missing sequence numbers, and if K<N, it will get a time window from the first non-lost Audit Message with subsequent sequence number. If N or more audit message are lost, C3 app will not be able to tell which time interval has lost audit data—so the system will declare all out audit data per client/topic/partition incomplete. There is a tradeoff when choosing N: higher N will allows handling up to N lost audit messages, but will cause larger time intervals that will be declared incomplete.

Implementation Details

In one embodiment, the following fields in AuditMessage are used to help with the detection of lost/duplicate audit messages AuditMessage:

```
"type": "record",
"name": "AuditMessage",
"namespace" : "io.confluent.blueway.avro.record",
"doc": "Audit sample data",
"fields" : [
........
{
"name": "session",
"type": "string",
"doc": "uuid generated for each client audit session"
},
```

```
AuditMessage:

{
"name": "sequence",
"type": "string",
"doe": "monotonically increasing sequence number generated
for each audit message"
},
{
"name": "attributes",
"type": "int"
"default": 0
"doc": "audit message attributes; currently, either 0 or 1 (if last
message before client shutdown)"
},
........
```

Interceptor Implementation Details

In one embodiment, on Interceptor initialization, it calculates a session ID, which is included in every audit message set by this interceptor until it shuts down.

sessionUD=UUID.randomUUID( ).toString( )

When a metric gets recorded for the topic/partition not seen by Interceptor since the initialization, a new map entry gets added to topic/partition audit buckets map. This map will also keep track of current sequence number per topic/partition: SequenceNumber(topic-partition). SequenceNumber(topic-partition) is initialized to 0. Every time AuditMessage gets created for a topic/partition and assigned a sequence number=SequenceNumbertopi c-partition, SequenceNumber(topic-partition) gets incremented.

In the end of each sampling period, Interceptor sends a set of audit messages for all topic/partition/window that have recorded metrics. For all topic/partitions without recorded metrics, Interceptor sends Audit Message with window==null, sample period=null; sequence number set as described above; message count=0.

On interceptor shutdown, interceptor sends audit messages for every known topic/partition with last bit of attributes set to 1 (shutdown flag). If a topic/partition has cached audit metrics, this last audit message will be filled in with audit metrics; otherwise, it will be a heartbeat audit message with window==null, sample period==null and message count=0.

Audit Topic Consumer Implementation Details

Audit Topic consumer client will keep track of the following data per topic/partition:

Session ID

A list of expected sequence numbers with timeouts. Consumer client may receive sequence numbers slightly out of order. When consumer client receives sequence number SK, after it received all sequence numbers in order, it will start waiting for sequence number SK+1. If the next sequence number it receives is SK+3, then it will also start waiting for sequence number SK+2. Since interceptors send audit messages per topic/partition at least once per sampling period, then we can set timeout to be 2*sampling period. This mechanism addresses timing out on collector failure, because missing sequence number will also mean that the system did not receive a heartbeat message.

Events that trigger decision about loss of audit message:

C3 app consumes audit topic message with Session ID that does not match currently stored Session ID. Failure scenario #2 and #3.

Timeout on a sequence number. Failure scenarios #1, and #4-8

Detecting a duplicate. This concerns a scenario where the system timeouts a sequence number and then it is received. Thus, the system keeps track of successful sequence numbers.

Computer Systems for Client Server System

Figure 5:
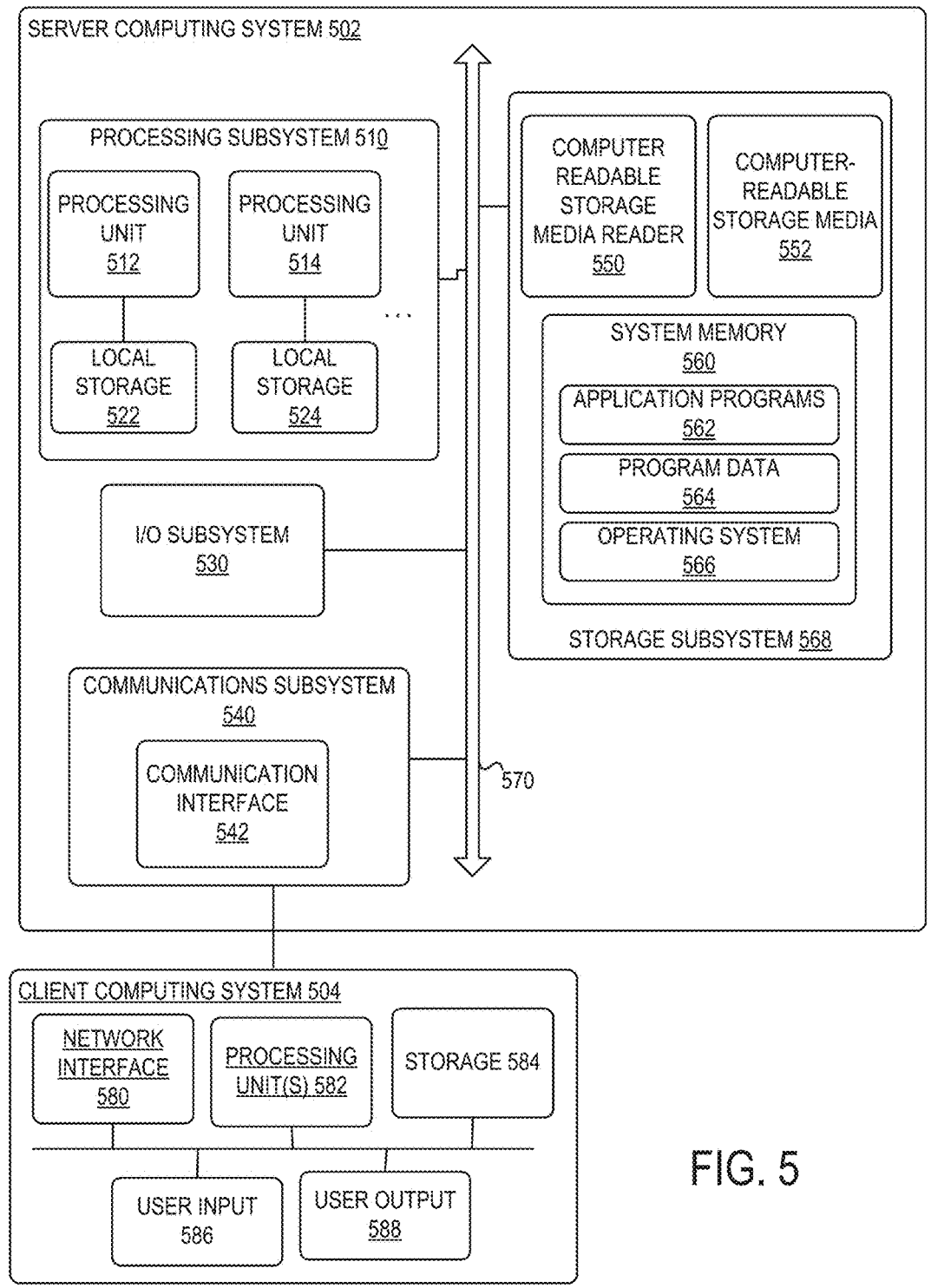
FIG. 5 is a simplified block diagram of a representative computing system and client computing system according to an embodiment of the present invention.

Various operations described herein may be implemented on computer systems. FIG. 5 shows a simplified block diagram of a representative computing system 502 and client computing system 504 usable to implement certain embodiments of the present invention. In various embodiments, computing system 502 or similar systems may implement the cleaning robot processor system, remote server, or any other computing system described herein or portions thereof. Client computing system 504 or similar systems may implement user devices such as a smartphone or watch with a robot cleaner application.

Computing system 502 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 502 may include processing subsystem 510. Processing subsystem 510 may communicate with a number of peripheral systems via bus subsystem 570. These peripheral systems may include I/O subsystem 530, storage subsystem 568, and communications subsystem 540.

Bus subsystem 570 provides a mechanism for letting the various components and subsystems of server computing system 504 communicate with each other as intended. Although bus subsystem 570 is shown schematically as a single bus, alternative embodiments of the bus subsystem may utilize multiple buses. Bus subsystem 570 may form a local area network that supports communication in processing subsystem 510 and other components of server computing system 502. Bus subsystem 570 may be implemented using various technologies including server racks, hubs, routers, etc. Bus subsystem 570 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 530 may include devices and mechanisms for inputting information to computing system 502 and/or for outputting information from or via computing system 502. In general, use of the term "input device" is intended to include all possible types of devices and mechanisms for inputting information to computing system 502. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 502 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 510 controls the operation of computing system 502 and may comprise one or more processing units 512, 514, etc. A processing unit may include one or more processors, including single core processor or multicore processors, one or more cores of processors, or combinations thereof. In some embodiments, processing subsystem 510 may include one or more special purpose co-processors such as graphics processors, digital signal processors (DSPs), or the like. In some embodiments, some or all of the processing units of processing subsystem 510 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 522, 524. Any type of processors in any combination may be included in processing unit(s) 512, 514.

In some embodiments, processing subsystem 510 may be implemented in a modular design that incorporates any number of modules (e.g., blades in a blade server implementation). Each module may include processing unit(s) and local storage. For example, processing subsystem 510 may include processing unit 512 and corresponding local storage 522, and processing unit 514 and corresponding local storage 524.

Local storage 522, 524 may include volatile storage media (e.g., conventional DRAM, SRAM, SDRAM, or the like) and/or non-volatile storage media (e.g., magnetic or optical disk, flash memory, or the like). Storage media incorporated in local storage 522, 524 may be fixed, removable or upgradeable as desired. Local storage 522, 524 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 512, 514 need at runtime. The ROM may store static data and instructions that are needed by processing unit(s) 512, 514. The permanent storage device may be a non-volatile read-and-write memory device that may store instructions and data even when a module including one or more processing units 512, 514 and local storage 522, 524 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 522, 524 may store one or more software programs to be executed by processing unit(s) 512, 514, such as an operating system and/or programs implementing various server functions such as functions of UPP system 102, or any other server(s) associated with UPP system 102. "Software" refers generally to sequences of instructions that, when executed by processing unit(s) 512, 514 cause computing system 502 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 512, 514. In some embodiments the instructions may be stored by storage subsystem 568 (e.g., computer readable storage media). In various embodiments, the processing units may execute a variety of programs or code instructions and may maintain multiple concurrently executing programs or processes. At any given time, some or all of the program code to be executed may be resident in local storage 522, 524 and/or in storage subsystem including potentially on one or more storage devices. Software may be implemented as a single program or a collection of separate programs or program modules that interact as desired. From local storage 522, 524 (or non-local storage described below), processing unit(s) 512, 514 may retrieve program instructions to execute and data to process in order to execute various operations described above.

Storage subsystem 568 provides a repository or data store for storing information that is used by computing system 502. Storage subsystem 568 provides a tangible non-transitory computer-readable storage medium for storing the basic programming and data constructs that provide the functionality of some embodiments. Software (programs, code modules, instructions) that when executed by processing subsystem 510 provide the functionality described above may be stored in storage subsystem 568. The software may be executed by one or more processing units of processing subsystem 510. Storage subsystem 568 may also provide a repository for storing data used in accordance with the present invention.

Storage subsystem 568 may include one or more non-transitory memory devices, including volatile and non-volatile memory devices. As shown in FIG. 5, storage subsystem 568 includes a system memory 560 and a computer-readable storage media 552. System memory 560 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 502, such as during start-up, may typically be stored in the ROM. The RAM typically contains data and/or program modules that are presently being operated and executed by processing subsystem 510. In some implementations, system memory 560 may include multiple different types of memory, such as static random access memory (SRAM) or dynamic random access memory (DRAM). Storage subsystem 568 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 568.

By way of example, and not limitation, as depicted in FIG. 5, system memory 560 may store application programs 562, which may include client applications, Web browsers, mid-tier applications, relational database management systems (RDBMS), etc., program data 564, and one or more operating systems 566. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 552 may store programming and data constructs that provide the functionality of some embodiments. Software (programs, code modules, instructions) that when executed by processing subsystem 510 a processor provide the functionality described above may be stored in storage subsystem 568. By way of example, computer-readable storage media 552 may include non-volatile memory such as a hard disk drive, a magnetic disk drive, an optical disk drive such as a CD ROM, DVD, a Blu-Ray® disk, or other optical media. Computer-readable storage media 552 may include, but is not limited to, Zip® drives, flash memory cards, universal serial bus (USB) flash drives, secure digital (SD) cards, DVD disks, digital video tape, and the like. Computer-readable storage media 552 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 552 may provide storage of computer-readable instructions, data structures, program modules, and other data for computing system 502.

In certain embodiments, storage subsystem 568 may also include a computer-readable storage media reader 550 that may further be connected to computer-readable storage media 552. Together and, optionally, in combination with system memory 560, computer-readable storage media 552 may comprehensively represent remote, local, fixed, and/or removable storage devices plus storage media for storing computer-readable information.

In certain embodiments, computing system 502 may provide support for executing one or more virtual machines. Computing system 502 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 502. Accordingly, multiple operating systems may potentially be run concurrently by computing system 502. Each virtual machine generally runs independently of the other virtual machines.

Communication subsystem 540 provides an interface to other computer systems and networks. Communication subsystem 540 serves as an interface for receiving data from and transmitting data to other systems from computing system 502. For example, communication subsystem 540 may enable computing system 502 to establish a communication channel to one or more client computing devices via the Internet for receiving and sending information from and to the client computing devices.

Communication subsystem 540 may support both wired and/or wireless communication protocols. For example, in certain embodiments, communication subsystem 540 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 540 may provide wired network connectivity (e.g., Ethernet) in addition to or instead of a wireless interface.

Communication subsystem 540 may receive and transmit data in various forms. For example, in some embodiments, communication subsystem 540 may receive input communication in the form of structured and/or unstructured data feeds, event streams, event updates, and the like. For example, communication subsystem 540 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 540 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 540 may also be configured to output the structured and/or unstructured data feeds, event streams, event updates, and the like to one or more databases that may be in communication with one or more streaming data source computers coupled to computing system 502.

Communication subsystem 540 may provide a communication interface 542, e.g., a WAN interface, which may provide data communication capability between the local area network (bus subsystem 570) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 502 may operate in response to requests received via communication interface 542. Further, in some embodiments, communication interface 542 may connect computing systems 502 to each other, providing scalable systems capable of managing high volumes of activity. Conventional or other techniques for managing server systems and server farms (collections of server systems that cooperate) may be used, including dynamic resource allocation and reallocation.

Computing system 502 may interact with various user-owned or user-operated devices via a wide-area network such as the Internet. An example of a user-operated device is shown in FIG. 5 as client computing system 502. Client computing system 504 may be implemented, for example, as a consumer device such as a smart phone, other mobile phone, tablet computer, wearable computing device (e.g., smart watch, eyeglasses), desktop computer, laptop computer, and so on.

For example, client computing system 504 may communicate with computing system 502 via communication interface 542. Client computing system 504 may include conventional computer components such as processing unit(s) 582, storage device 584, network interface 580, user input device 586, and user output device 588. Client computing system 504 may be a computing device implemented in a variety of form factors, such as a desktop computer, laptop computer, tablet computer, smart phone, other mobile computing device, wearable computing device, or the like.

Processing unit(s) 582 and storage device 584 may be similar to processing unit(s) 512, 514 and local storage 522, 524 described above. Suitable devices may be selected based on the demands to be placed on client computing system 504; for example, client computing system 504 may be implemented as a "thin" client with limited processing capability or as a high-powered computing device. Client computing system 504 may be provisioned with program code executable by processing unit(s) 582 to enable various interactions with computing system 502 of a message management service such as accessing messages, performing actions on messages, and other interactions described above. Some client computing systems 504 may also interact with a messaging service independently of the message management service.

Network interface 580 may provide a connection to a wide area network (e.g., the Internet) to which communication interface 540 of computing system 502 is also connected. In various embodiments, network interface 580 may include a wired interface (e.g., Ethernet) and/or a wireless interface implementing various RF data communication standards such as Wi-Fi, Bluetooth®, or cellular data network standards (e.g., 3G, 4G, LTE, etc.).

User input device 586 may include any device (or devices) via which a user may provide signals to client computing system 504; client computing system 504 may interpret the signals as indicative of particular user requests or information. In various embodiments, user input device 586 may include any or all of a keyboard, touch pad, touch screen, mouse or other pointing device, scroll wheel, click wheel, dial, button, switch, keypad, microphone, and so on.

User output device 588 may include any device via which client computing system 504 may provide information to a user. For example, user output device 588 may include a display to display images generated by or delivered to client computing system 504. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 588 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 512, 514 and 582 may provide various functionality for computing system 502 and client computing system 504, including any of the functionality described herein as being performed by a server or client, or other functionality associated with message management services.

It will be appreciated that computing system 502 and client computing system 504 are illustrative and that variations and modifications are possible. Computer systems used in connection with embodiments of the present invention may have other capabilities not specifically described here. Further, while computing system 502 and client computing system 504 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

While the invention has been described with respect to specific embodiments, one skilled in the art will recognize that numerous modifications are possible. Embodiments of the invention may be realized using a variety of computer systems and communication technologies including but not limited to specific examples described herein.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

What is claimed is:

1. A system for verification of messages in a distributed message queue, comprising:
    a central verification analysis system, installed on at least one central verification analysis server, and configured to receive and aggregate verification reports and organize verification reports by a message topic;
    a producer metrics collector module installed on a producer computing device and configured to collect metrics on messages sent to a distributed message queue system and send producer verification reports to the central verification analysis system;
    a consumer metrics collector module installed on at least one consumer computing device, and configured to collect metrics on messages received from a distributed message queue system and send consumer verification reports to the central verification analysis system;
    a metric management application, installed on a central management server, that presents to users analysis of verification information aggregated by the central verification analysis system;
    wherein the producer metrics collector module is configured to add a cumulative checksum to messages sent out by the producer computer;
    wherein the producer metrics collector module is configured to send out verification messages at least when no other messages are sent in a particular time period;
    wherein the central verification analysis system determines (a) whether any messages were lost or duplicated, (b) the time it takes produced messages to be consumed, and (c) uses a combination of verification messages and cumulative checksums sent via the producer and consumer metrics collectors to assess the fidelity of the computations in performed in (a);
    a graphical user interface provided by the metric management application allowing a user to interact with and view the calculations completed by the central verification analysis system and request receipt of notifications.

2. The system of claim 1 further comprising an API for providing the graphical user interface.

3. The system of claim 1 wherein the verification reports are encapsulated in messages and sent through a distributed message queue system.

4. The system of claim 3 wherein the producer verification reports contain:
    counts of messages sent by a producer;
    a count on the number of bytes sent by a producer;
    a measurement of message sizes; and
    a transport time.

5. The system of claim 3 wherein the producer verification reports contain:
    aggregate checksums for the data sent by a producer.

6. The system of claim 5 wherein the checksum is a cumulative checksum.

7. The system of claim 6 wherein the cumulative checksum comprises an aggregation of existing checksums.

8. The system of claim 1 wherein the producer metrics collector module sends producer verification reports for each time window, and sends a report indicating no messages were sent during a time window if no messages were sent.

9. The system of claim 1 wherein the verification reports include counts and checksums on individual topics.

10. The system of claim 1 wherein the producer metrics collector module attaches a time stamp to each message, and wherein the producer metrics collector module and the consumer metrics collector module groups metrics by time stamps.

11. The system of claim 1 wherein the producer metrics collector module attaches a sequence number to each message, and wherein the consumer metrics collector module detects missing sequence numbers.

12. A system for verification of messages in a distributed message queue, comprising:
    a central verification analysis system, installed on at least one central verification analysis server, and configured to receive and aggregate verification reports and organize verification reports by a message topic;
    a producer metrics collector module installed on a producer computing device and configured to collect metrics on messages sent to a distributed message queue system and send producer verification reports to the central verification analysis system, wherein the producer metrics collector module attaches a time stamp to each message, wherein the producer metrics collector module attaches a sequence number to each message;
    wherein the producer verification reports contain (a) counts of messages sent by a producer, (b) a count on the number of bytes sent by a producer, (c) a measurement of message sizes, and (d) a transport time;
    wherein the producer metrics collector module sends producer verification reports for each time window;
    wherein the producer metrics collector module sends a report indicating no messages were sent during a time window if no messages were sent;
    a consumer metrics collector module installed on at least one consumer computing device, and configured to collect metrics on messages received from a distributed message queue system and send consumer verification reports to the central verification analysis system;

wherein the consumer verification reports contain (a) counts of messages received from a producer, (b) a count on the number of bytes received from a producer, (c) a measurement of message sizes, and (d) a transport time;

wherein the consumer metrics collector module groups metrics by time stamps;

wherein the consumer metrics collector module detects missing sequence numbers;

wherein the consumer metrics collector module sends a report indicating no messages were received during a time window if no messages were received;

wherein the verification reports include counts and checksums on individual topics;

a metric management application, installed on a central management server, that presents to users analysis of verification information aggregated by the central verification analysis system;

wherein the producer metrics collector module is configured to add a cumulative checksum to messages sent out by the producer computer;

wherein the producer metrics collector module is configured to send out verification messages at least when no other messages are sent in a particular time period;

wherein the central verification analysis system determines (a) whether any messages were lost or duplicated, (b) the time it takes produced messages to be consumed, and (c) uses a combination of verification messages and cumulative checksums sent via the producer and consumer metrics collectors to assess the fidelity of the computations in performed in (a); and a graphical user interface provided by the metric management application allowing a user to interact with and view the calculations completed by the central verification analysis system and request receipt of notifications, wherein an API provides the graphical user interface.

13. A method for verification of messages in a distributed message queue, comprising:

collecting metrics in a producer metrics collector module on messages sent by a producer to a distributed message queue system;

sending producer verification reports;

collecting metrics in a consumer metrics collector module on messages received from a distributed message queue system at a consumer;

sending consumer verification reports;

receiving and aggregating verification reports at a central verification analysis system and organizing verification reports by a message topic;

presenting to users analysis of verification information aggregated by the central verification analysis system;

wherein the producer metrics collector module adds a cumulative checksum to messages sent out by the producer;

wherein the producer metrics collector module sends out verification messages at least when no other messages are sent in a particular time period; and wherein the central verification analysis system determines (a) whether any messages were lost or duplicated, (b) the time it takes produced messages to be consumed, and (c) uses a combination of verification messages and cumulative checksums sent via the producer and consumer metrics collectors to assess the fidelity of the computations in performed in (a).

14. The method of claim 13 further comprising encapsulating the verification reports in messages and sending encapsulated reports through a distributed message queue system.

15. The method of claim 13 further comprising aggregating checksums for the data sent by a producer to provide an aggregated checksum, wherein the aggregated checksum is a cumulative checksum.

16. The method of claim 15 wherein the cumulative checksum comprises an aggregation of existing checksums.

17. The system of claim 13 wherein the producer metrics collector module sends producer verification reports for each time window, and sends a report indicating no messages were sent during a time window if no messages were sent.

18. The method of claim 13 wherein the verification reports include counts and checksums on individual topics.

19. The method of claim 13 wherein the producer metrics collector module attaches a time stamp to each message, and wherein the producer metrics collector module and the consumer metrics collector module groups metrics by time stamps.

20. The method of claim 13 wherein the producer metrics collector module attaches a sequence number to each message, and wherein the consumer metrics collector module detects missing sequence numbers.

* * * * *